United States Patent [19]

Harry et al.

[11] Patent Number: 4,470,797
[45] Date of Patent: Sep. 11, 1984

[54] PREFORM LOADER

[75] Inventors: Ieuan L. Harry, Nashua; Stephen N. Moysenko, Salem, both of N.H.

[73] Assignee: The Continental Group Inc., Stamford, Conn.

[21] Appl. No.: 316,714

[22] Filed: Oct. 30, 1981

[51] Int. Cl.³ .............................................. B29C 17/07
[52] U.S. Cl. ................................... 425/534; 198/485; 198/646; 198/653; 198/656; 264/535; 425/526; 425/538
[58] Field of Search ............... 425/522, 534, 526, 538; 264/535; 198/485, 656, 646, 653

[56] References Cited

U.S. PATENT DOCUMENTS

| | | | |
|---|---|---|---|
| 2,644,309 | 7/1953 | Detrez | 198/485 X |
| 3,339,230 | 9/1967 | Farrell | 425/526 |
| 3,880,301 | 4/1975 | Reilly | 198/695 X |
| 3,999,927 | 12/1976 | Kellogg | 425/534 |
| 4,116,325 | 9/1978 | McDonald | 198/653 X |
| 4,310,282 | 1/1982 | Spurr et al. | 425/533 X |
| 4,313,720 | 2/1982 | Spurr | 425/534 X |
| 4,382,760 | 5/1983 | Wiatt et al. | 264/535 X |

*Primary Examiner*—Jan Silbaugh
*Attorney, Agent, or Firm*—Charles E. Brown

[57] ABSTRACT

This relates to a loader for loading preforms into collets of pallets in a blow molding machine wherein a plurality of preforms are simultaneously loaded into the blow molding molds during each operation of the machine. The loader includes a preform supply wherein there is a preform receptacle having a number of preform pockets corresponding to the number of preforms to be loaded in a pallet. A preform carrier is moved between a position underlying the preform receptable for receiving preforms therefrom to a position underlying a pallet presented to the loading station. The preform positioning device then engages the bottoms of preforms and moves the preforms up through the preform carrier into the lower end of the collets of pallets where they are automatically retained in place by spring loaded detents. This abstract forms no part of the specification of this application and is not to be construed as limiting the claims of the application.

20 Claims, 8 Drawing Figures

PREFORM LOADER

This invention relates in general to new and useful improvements in loading preforms into collets carried by pallets in conjunction with a blow molding process.

There has been developed a transport system for transporting a plurality of preforms into a blow molding apparatus for the simultaneous blow molding of such preforms into hollow articles such as bottles. Each transport is provided with a plurality of separate collets which receive the neck portion of the preform and which collets are provided with resilient detents automatically releasably to hold the preforms in position. This invention has to do with the loading of such preforms into the collets of pallets.

In accordance with this invention, the required number of preforms are loaded into a preform carrier and are moved into alignment with and below the collets of a pallet positioned at a loading station of a blow molding machine. With the preforms so positioned, the preforms are simultaneously moved upwardly to engage the preforms with the collets.

The preform carrier is provided with a notch opening through an edge thereof, each notch being adapted to receive a preform and the notches permitting the withdrawal of the preform carrier relative to the preforms which have been associated with the collets.

Each preform is loaded into its respective collet by merely engaging the bottom of the preform and moving the same vertically into the respective collet where it is automatically retained in place. In order to accomplish this, there is provided an elongated bar positioned in alignment with the intended position of the pallet and being vertically movable. The bar is provided with a plurality of inserts, one for each preform, and each insert is configured for engagement with the bottom of a preform. With preforms in alignment with the collets, the bar is merely elevated by means of a single central extensible fluid motor to force the preforms into the collets.

The preform carrier is loaded with preforms by means of a preform supply apparatus which includes a fixed receptacle having a plurality of open ended vertical preform pockets extending therethrough. The preform receptacle underlies a supply for preforms, such as a hopper, and while the preform carrier is transferring one set of preforms from the preform supply to a pallet, the receptacle is being supplied with another set of preforms. The receptacle has associated therewith a gate member or retainer which normally underlies the preform pockets, but is movable to permit the preforms to drop out of the pockets into the preform carrier.

With the above and other objects in view that will hereinafter appear, the nature of the invention will be more clearly understood by reference to the following detailed description, the appended claims, and the several views illustrated in the accompanying drawings.

Figure 1:
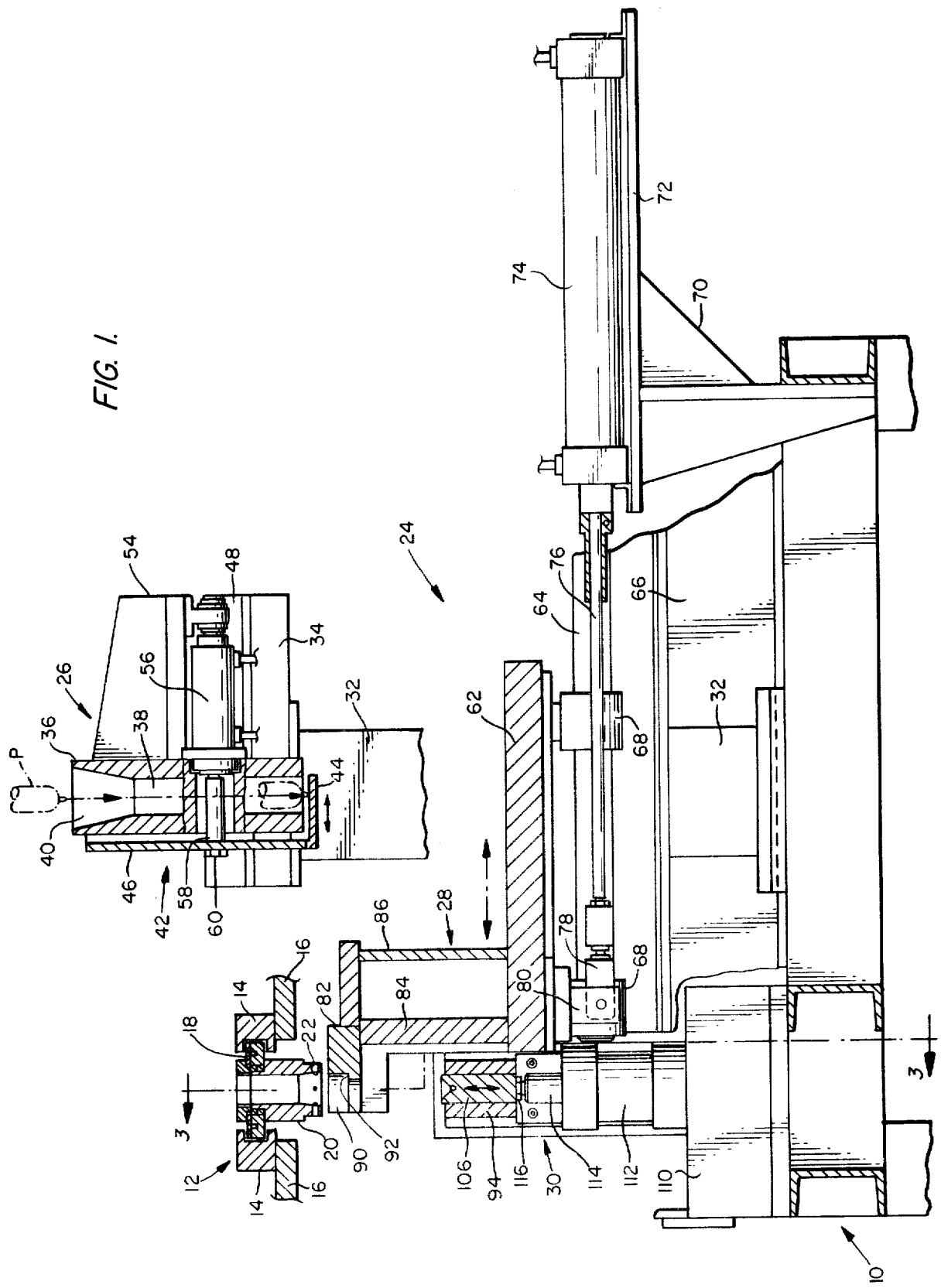
FIG. 1 is a vertical sectional view taken through the preform loader transversely to the length of as associated blow molding machine, and shows the general details of the preform loader.

Referring now the drawings in detail, it is to be understood that this invention relates to a loader for loading preforms into collets of pallets which are moved by mechanisms of a blow molding machine to present the preforms to blow molds for the blow molding thereof into hollow articles such as bottles.

A portion only of such a machine is illustrated. That portion includes part of a frame 10 and a track 12 for the pallets. As shown in the upper left part of FIG. 1, the track 12 includes two track members 14 which are carried by two spaced apart frame members 16 of the frame 10. The track 12 is illustrated as having positioned therein a pallet 18 which carries a plurality of collets 20. The number of collets will vary, and while the present machine incorporates twelve collets per pallet, a larger number of collets is envisioned. Each collet 20 is rotatably journalled in the respective pallet 18. The lower part of each collet 20 is provided with spring loaded ball detent assemblies 22 for automatically locking a neck finish of a preform within the collet.

It is to be understood that the pallets 20 presented to a loading station will each be positioned in a preselected longitudinal part of the track 12 and thus will present the collets thereof in exactly the same position each time a pallet is presented to the loading station.

The overall components of the loader, which is the subject of this invention, are generally illustrated in FIG. 1 and the loader is generally identified by the numeral 24. The loader 24 includes a preform supply 26, a transfer mechanism 28 and a preform positioning device 30.

The preform supply 27 includes a pair of upright supports 32 extending upwardly from the frame 10. A horizontal support member 34 is mounted on top of each of the supports 32 and carries one end of a preform receptacle 36. The preform receptacle 36 is vertically fixed and is provided with a plurality of preform pockets 38 which extend vertically therethrough. Each preform pocket 38 has a flared upper portion 40 so as to facilitate the dropping of a preform P thereinto, as is clearly shown in FIG. 1. It is to be understood that the preform receptacle 36 underlies a suitable hopper or like pallet supply device which constantly urges preforms into the pockets 38.

In order to provide for only the selective removal of preforms from the pockets 38, there is provided a preform retainer or gate, generally identified by the numeral 42. The gate 42 includes a lower horizontal flange 44 which may be positioned to underlie the preform receptacle 36 and prevent preforms from passing out through the bottoms of the preform pockets 38. The preform retainer or gate 42 also includes an upstanding flange 46 so that the preform retainer 42 is generally L-shaped in cross section.

Figure 2:
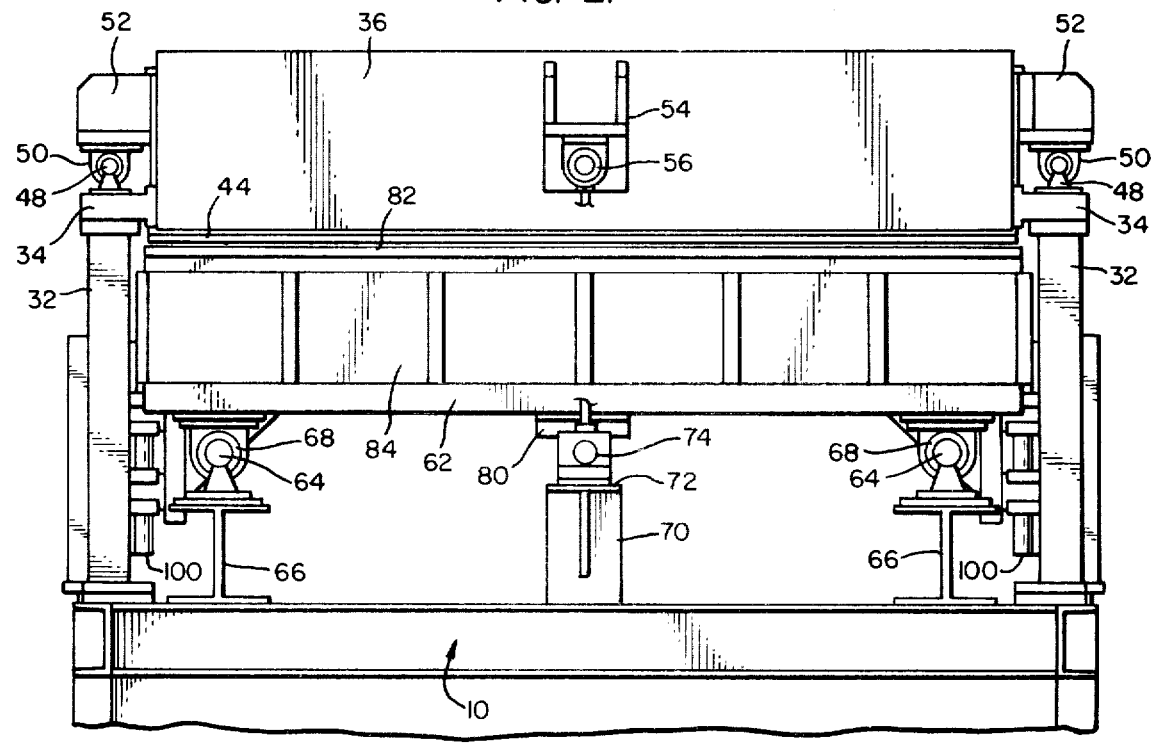
FIG. 2 is a rear elevational view of the loader, and shows the mounting of various components thereof.

Each horizontal support 34 has mounted on the top thereof a horizontal rail 48. Each rail 48, as is best shown in FIG. 2, has slidably mounted thereon a follower 50. Each follower 50 is connected to a respective end of the retainer 42 by way of a bracket 52. Thus, the retainer 42 is mounted for sliding movement to the left relative to the preform receptacle 36, as viewed in FIG. 1, and then return.

On the face of the preform receptacle 36 remote from the upstanding flange 46 of the retainer, there is a suitable bracket 54 which extends horizontally and which has mounted on the underside thereof an extensible fluid motor 56 in the form of a double acting fluid cylinder. The fluid motor 56 is located centrally of the ends of the receptacle 36 and is provided with a piston rod 58 which extends through the receptacle 36 and is secured to the upstanding flange 46 by way of a bolt 60. The fluid motor 56 serves to position the flange 44 relative to the preform receptacle 36 selectively to release preforms P from the pockets 38.

The transfer device 28 includes a horizontally disposed carriage 62 mounted for back and fourth movement in a horizontal direction on a pair of rails 64 which, in turn, are mounted on horizontal beams 66 which are mounted on the frame 10. There is a pair of followers 68 on each rail with the followers 68 being secured to the underside of the carriage 62 so that the carriage 62 is supported by four of the followers 68.

A mounting bracket assembly 70 extends upwardly from the frame 10 between the beams 66 and includes an upper mounting plate 72 on which there is mounted an extensible fluid motor 74 in the form of a double acting cylinder. The cylinder has a piston rod 76 which is connected by way of a fitting 78 to a connector 80 depending from the carriage 62. Thus, the carriage 62 is selectively movable along the rails 64.

Figure 7:
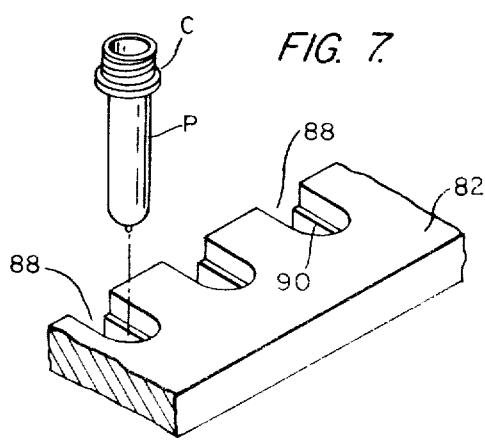
FIG. 7 is an enlarged fragmentary perspective view of the preform carrier, showing the formation of notches in one edge of the carrier for receiving preforms.

The transfer device 22 also includes a preform carrier 82 which is in the form of a horizontal bar that is supported by the carriage 62 in vertically spaced offset relation by means of suitable mounting brackets 84, 86. The preform carrier 82, as is best shown in FIG. 7, is provided along one edge thereof with a plurality of notches 88, each notch 88 defining a socket for the upper part of a preform P. Each notch 88 is provided with an upwardly facing shoulder 90 on which a collar C of the preform rests when the preform is mounted in the notch 90.

It is to be understood that the fluid motor 74 is operable to transfer the preform carrier 82 from a position wherein the notches 90 thereof are aligned with the preform pockets 38 of the preform supply 26 for receiving preforms from the preform pockets to a position underlying and in alignment with the collets 20 of the pallet 18 which is positioned for receiving preforms.

Figure 3:
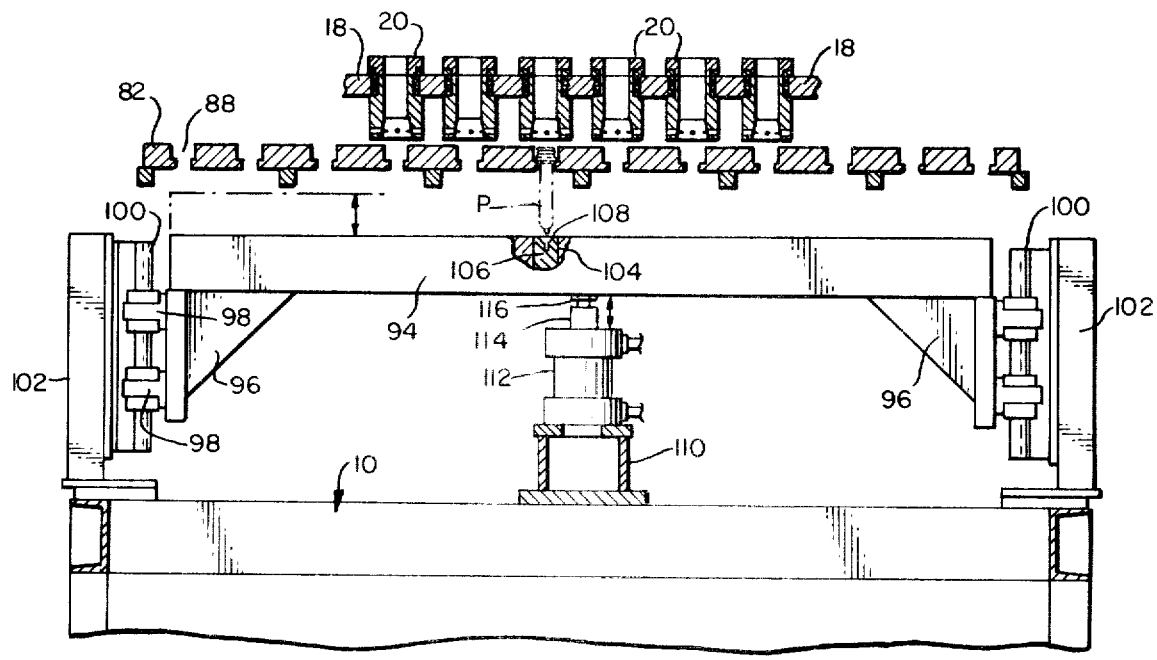
FIG. 3 is a vertical sectional view taken generally along the line 3—3 of FIG. 1 longitudinally of the blow molding machine and transversely of the preform loader.
Figure 4:
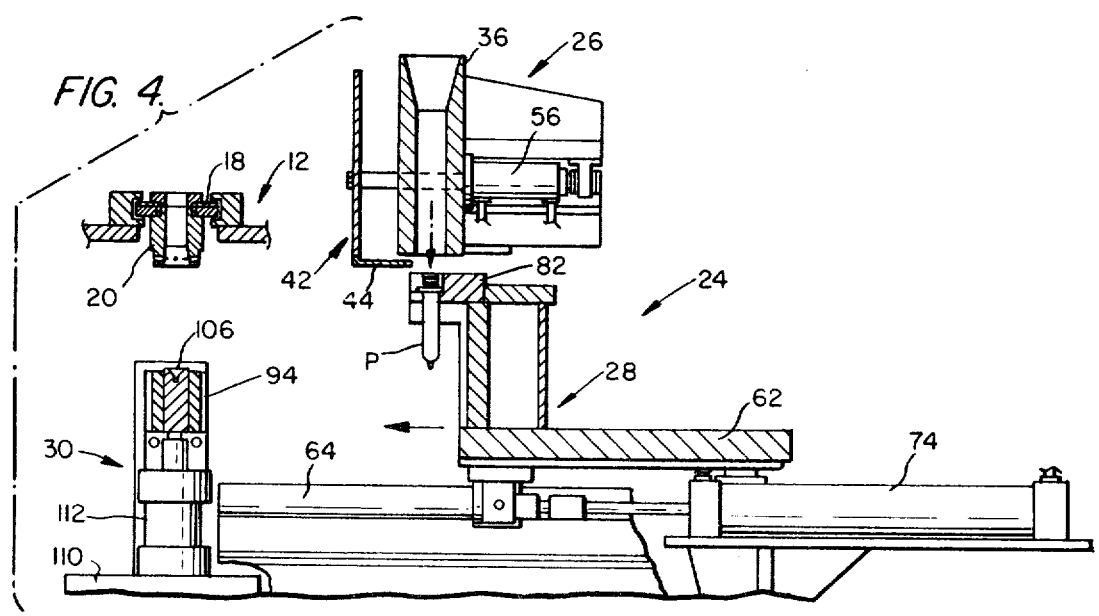
FIG. 4 is a schematic sectional view showing the preform carrier being loaded with preforms from the supply as a first step of loading preforms into collets of a pallet.
Figure 5:
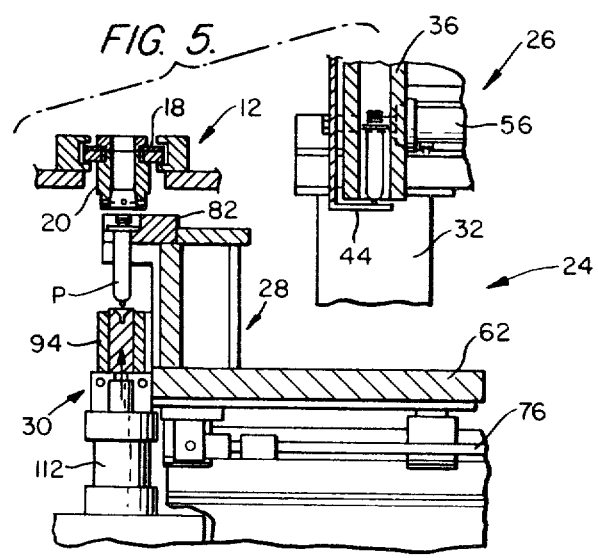
FIG. 5 is a schematic sectional view similar to FIG. 4, but with the preform carrier shifted away from the supply to present the preforms in alignment with and below collets of the pallet.
Figure 6:
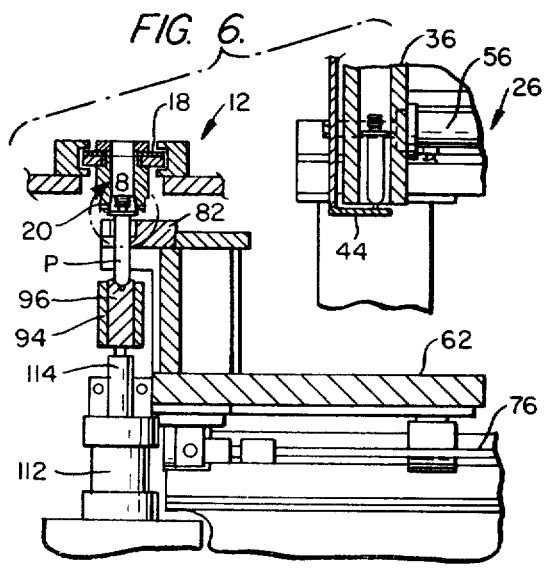
FIG. 6 is a vertical sectional view similar to FIG. 4, and shows the preforms being positioned within the lower parts of the collets.

The preform positioning device 30 includes an elongated horizontally disposed bar 94 which is positioned below and in alignment with the track 12. The bar 94, as is best shown in FIG. 3, is provided at its ends with a mounting bracket 96. Each mounting bracket 96 is provided with a pair of vertically spaced followers 98 which are mounted on a vertical rail 100 carried by an upright support 102 which, in turn, is supported by the frame 10.

The bar 94 is provided with a plurality of vertical bores 104 which are aligned with the position of collets carried by the pallet 18 positioned at the loading station. Each bore 104 has removably positioned therein a plug 106 which is provided with an upper end 108 of a configuration to match with the configuration of the bottom of an associated preform P. It is to be understood that the plugs 106 may be replaced by similar plugs when the preform bottom configuration is modified.

With particular reference to FIG. 1, it is to be understood that when the preform carrier 82 is positioned beneath the track 12, as shown in FIG. 1, the preforms carried by the preform carrier 82 are disposed in alignment with the plugs 106 and are spaced a short distance thereabove, there being sufficient clearance so that the bottoms of the preforms do not strike the bar 94 or the plugs 106. The preforms P are now ready to be loaded into the collets 20.

Referring once again to FIG. 3, it will be seen that there is carried by the frame 10 a box support 110 on which there is mounted a vertically oriented extensible fluid motor 112 in the form of a double acting cylinder. The fluid motor 112 has an uppermost piston rod 114 which is provided with an adjustable connection 116 with the bar 94.

Figure 8:
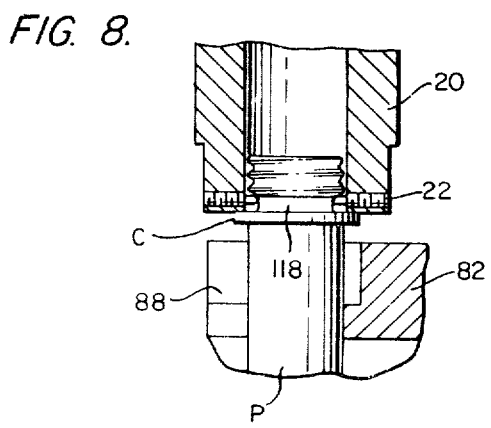
FIG. 8 is an enlargement of the sectional view of FIG. 6 within the circle identified by the numeral 8, and shows the manner in which preforms are automatically received and held by the collets.

The fluid motor 112 is actuated to lift the bar 94 and to utilize the plugs 106 to push the upper neck finish portion of all of the preforms P into respective ones of the collets 20. With reference to FIG. 8, it will be seen that when the preform collar C engages the bottom of a respective collet 20, the spring loaded detents 22 are automatically engaged in an annular groove 118 in the neck of the preform immediately above the collar. Thus the engagement of the preform in its respective collet is automatic and the locking of the preform in place is assured.

After the bar 94 is again lowered, the preform carrier 82 is again free to move to the right as viewed in FIG. 1 to its position underlying the preform receptacle 36. Because of the notched construction of the pockets for the preforms in the preform carrier 82, the preform carrier 82 is free to retract relative to the stationary preforms.

It is to be understood that while the preform carrier 82 is moving preforms into alignment with the pallet, the pockets 38 of the preform receptacle 36 are being filled with a new supply of preforms so that the receptacle 36 will be fully loaded when the preform carrier 82 arrives back at its starting position.

Although only a preferred embodiment of the invention has been specifically illustrated and described, it is to be understood that minor variations may be made in the loader mechanism without departing from the spirit and scope of the invention as defined by the appended claims.

We claim:

1. For use in a blow molding machine, a pallet for presenting at the same time a plurality of preforms to the blow molding machine, said pallet carrying a plurality of individual collets for receiving and carrying preforms, a track for receiving and determining the position of a pallet, a preform supply positioned adjacent said track, preform positioning means underlying said track for positioning preforms in said collets, and laterally movable transfer means for receiving preforms from said preform supply and laterally moving preforms into and positively positioning preforms in alignment with said track and said preform positioning means and between said track and said preform positioning means.

2. Apparatus according to claim 1 wherein said preform supply includes a fixed receptacle having therein a plurality of open ended vertical preform pockets, and a movable retainer underlying said preform pockets for normally retaining preforms in said fixed receptacle.

3. Apparatus according to claim 2 wherein said retainer is L-shaped in vertical section and includes a lower flange underlying said fixed receptacle and an upstanding flange disposed alongside said fixed receptacle.

4. Apparatus according to claim 3 wherein there are positioning means carried by said receptacle and connected to said retainer for moving said retainer to a released position.

5. Apparatus according to claim 4 wherein said retainer has opposite ends mounted on rails, and said retainer positioning means is in the form of an extensible fluid motor carried by said receptacle on the side of said receptacle remote from said upstanding flange.

6. Apparatus according to claim 1 wherein said transfer means includes a carriage mounted for reciprocating movement on spaced apart rails, and a preform carrier mounted on said carriage for movement with said carriage, said preform carrier having a plurality of preform receiving notches opening through an edge thereof whereby said carrier may be withdrawn relative to preforms seated in a pallet.

7. Apparatus according to claim 6 together with a transfer device connected to said carriage for shifting said preform carrier between alignment with said preform supply and alignment with said track.

8. Apparatus according to claim 1 wherein said preform positioning means includes an elongated bar aligned with said track, means mounting opposite ends of said bar for guided movement toward and away from said track, and an extensible fluid motor connected to said bar for shifting said bar.

9. Apparatus according to claim 8 wherein there is a single one of said extensible fluid motor and said fluid motor is coupled to a central portion of said bar.

10. Apparatus according to claim 8 wherein said bar has an insert for each intended preform, and each insert has a contoured upper socket for matching a preform bottom configuration.

11. In a blow molding machine, a pallet for presenting at the same time a plurality of preforms to the blow molding machine, said pallet carrying a plurality of individual collets for receiving and carrying preforms, a track for receiving and determining the position of a pallet, a preform supply positioned laterally adjacent said track, preform positioning means underlying said track for positioning preforms in said collets, and laterally movable transfer means for receiving preforms from said preform supply and laterally moving preforms into and positively positioning preforms in alignment with said track and said preform positioning means and between said track and said preform positioning means.

12. Apparatus according to claim 11 wherein said preform supply includes a fixed receptacle having therein a plurality of open ended vertical preform pockets, and a movable retainer underlying said preform pockets for normally retaining preforms in said fixed receptacle.

13. Apparatus according to claim 2 wherein said retainer is L-shaped in vertical section and includes a lower flange underlying said fixed receptacle and an upstanding flange disposed alongside said fixed receptacle.

14. Apparatus according to claim 13 wherein there are positioning means carried by said receptacle and connected to said retainer for moving said retainer to a released position.

15. Apparatus according to claim 14 wherein said retainer has opposite ends mounted on rails, and said retainer positioning means is in the form of an extensible fluid motor carried by said receptacle on the side of said receptacle remote from said upstanding flange.

16. Apparatus according to claim 11 wherein said transfer means includes a carriage mounted for reciprocating movement on spaced apart rails, and a preform carrier mounted on said carriage for movement with said carriage, said preform carrier having a plurality of preform receiving notches opening through an edge thereof whereby said carrier may be withdrawn relative to preforms seated in a pallet.

17. Apparatus according to claim 16 together with a transfer device connected to said carriage for shifting said preform carrier between alignment with said preform supply and alignment with said track.

18. Apparatus according to claim 11 wherein said preform positioning means includes an elongated bar aligned with said track, means mounting opposite ends of said bar for guided movement toward and away from said track, and an extensible fluid motor connected to said bar for shifting said bar.

19. Apparatus according to claim 18 wherein there is a single one of said extensible fluid motor and said fluid motor is coupled to a central portion of said bar.

20. Apparatus according to claim 18 wherein said bar has an insert for each intended preform, and each insert has a contoured upper socket for matching a preform bottom configuration.

* * * * *